US 6,746,077 B2

(12) United States Patent
Klukowski

(10) Patent No.: US 6,746,077 B2
(45) Date of Patent: Jun. 8, 2004

(54) SEAT PAN OF AN AUTOMOBILE VEHICLE SEAT INCLUDING AN ANTI-SUBMARINING CROSSMEMBER

(75) Inventor: Slawomir Klukowski, Paris (FR)

(73) Assignee: Faurecia Sieges d'Automobile S.A. (FR)

( * ) Notice: Subject to any disclaimer, the term of this patent is extended or adjusted under 35 U.S.C. 154(b) by 0 days.

(21) Appl. No.: 10/290,454

(22) Filed: Nov. 8, 2002

(65) Prior Publication Data

US 2004/0051353 A1 Mar. 18, 2004

(30) Foreign Application Priority Data

Nov. 12, 2001 (FR) ............................................. 01 14569

(51) Int. Cl.$^7$ ................................................. B60N 2/42
(52) U.S. Cl. ................................. 297/216.1; 297/284.11
(58) Field of Search ...................................... 297/216.1

(56) References Cited

U.S. PATENT DOCUMENTS

| 6,050,635 | A | * | 4/2000 | Pajon et al. | ............... | 297/216.1 |
| 6,386,631 | B1 | * | 5/2002 | Masuda et al. | ........... | 297/216.1 |
| 6,557,935 | B2 | * | 5/2003 | Choi | ........................ | 297/216.1 |
| 6,648,409 | B1 | * | 11/2003 | Laporte | .................... | 297/216.1 |

FOREIGN PATENT DOCUMENTS

| DE | 3841688 A1 | 6/1990 | | |
| DE | 19859197 A1 | 7/1999 | | |
| FR | 2747080 | 10/1997 | | |
| GB | 1348873 | 3/1974 | | |
| JP | 01275230 A | * 11/1989 | ............ | B60N/1/06 |
| JP | 05286387 A | * 11/1993 | ............ | B60N/2/42 |
| WO | WO 01/19641 A1 | 3/2001 | | |

OTHER PUBLICATIONS

French Search Report, FA610149, FR0114569, Jul. 4, 2002, pp. 1–2.

* cited by examiner

*Primary Examiner*—Anthony D. Barfield
(74) *Attorney, Agent, or Firm*—Connolly Bove Lodge & Hutz LLP

(57) ABSTRACT

Seat pan (3) of an automobile vehicle seat including an anti-submarining crossmember (6) which extends crosswise and which can move towards the rear from a rest position to an extension position and towards the front from the extension position. The crossmember (6) is installed so as to pivot around a transverse axis (A) on a sliding carriage (7) guided in translation on the seat pan framework. Extension means (10) are arranged to connect the crossmember (6) and the carriage (7) so as to pivot the crossmember in relation to the carriage from the rest position to the extension position and energy dissipation means (9) connecting the carriage (7) to the seat pan framework (5) to exert a retention force on the carriage during movement of the carriage forwards.

9 Claims, 5 Drawing Sheets

SEAT PAN OF AN AUTOMOBILE VEHICLE SEAT INCLUDING AN ANTI-SUBMARINING CROSSMEMBER

Figure 1:
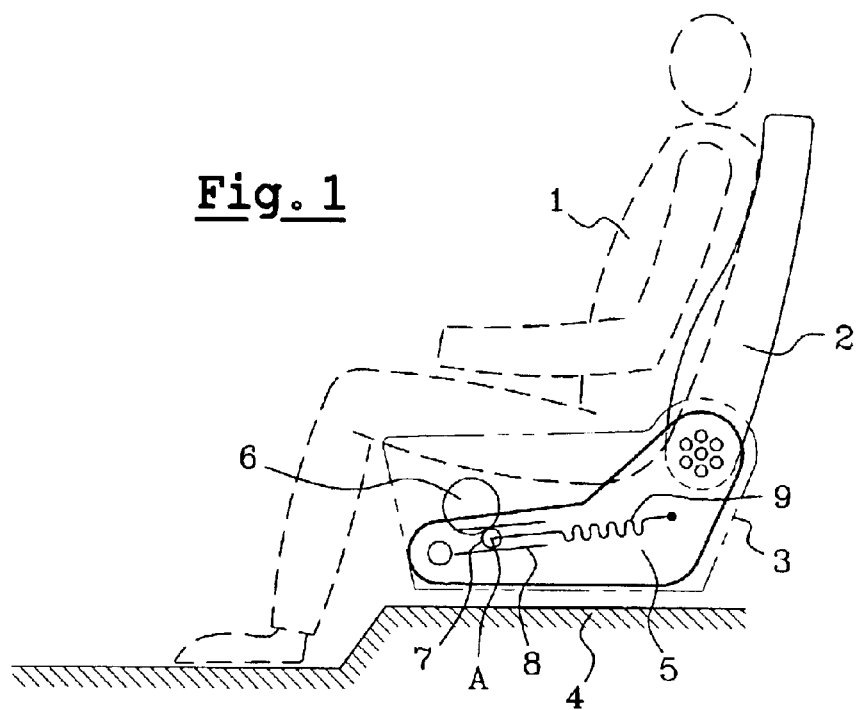

This invention concerns an automobile vehicle seat pan including an anti-submarining crossmember.

Conventionally, seatbelts have an oblique portion and a ventral portion which are applied respectively with a certain tension against the chest and the pelvis of the person using the seat.

When a shock on the vehicle tends to throw the user towards the front of the vehicle, for example during an accident, the seatbelt is blocked, in a known manner, to hold the user as firmly as possible against the seat. However, the user is then submitted to a high deceleration and, under his or her inertia, moves in relation to the belt. This movement can cause serious injuries to the body, in particular abdominal injuries, when the user's pelvis tends to pass under the ventral portion of the seatbelt by the sliding of the user's buttocks on the seat pan. This phenomenon is generally called submarining.

To solve this problem, it is already known to use a transverse bar, also called "anti-submarining crossmember" which is placed crosswise in the seat pan under the cushions of the seat. This bar is provided to limit, in the case described above, the movement of the user's pelvis towards the front of the seat and is designed so that it can distort or move under the force exerted by the pelvis whilst absorbing a part of the movement energy.

In the case where the bar only distorts, the possibility of movement corresponding to the distortion of the bar is then low. The result is that, with a high energy absorption over a small distance, the forces on the pelvis of the passenger are necessarily high.

To improve such a system, it has been planned, specially in document FR-A-2747080, to use an anti-submarining crossmember which is placed crosswise in the seat pan and which extends during the shock to form an obstacle preventing the user's pelvis from moving. From its maximum extended position, the crossmember can move forwards allowing a certain movement of the pelvis under the control of energy absorption means.

In the system described in the above mentioned document, the crossmember is connected by its ends to two links pivoting on the seat pan framework and, during a shock, the crossmember tilts upwards under the action of a seatbelt pyrotechnical pretensioner to an extended position to form an obstacle preventing the user's buttocks from moving forwards.

When the crossmember is in extended position, the user's pelvis exerts a thrust on the crossmember which may cause excessive compression of the user's lumbar region. Energy dissipation means are then provided to limit the force transmitted by the crossmember to the user by enabling, from a predetermined threshold, progressive retraction of the crossmember into the seat pan restraining but however enabling a certain movement of the pelvis. The possible movement of the crossmember during the energy absorption phase can be relatively high and, therefore, for a given energy, generate forces lower than in the previous case.

However, a disadvantage of this system is that, before the energy absorption phase, the crossmember extends by pivoting forwards which is inconsistent with the pelvis retention effect sought at the start of the deceleration due to the shock.

The system described in document WO-01/19641 remedies this disadvantage by using a pyrotechnical pretensioner system which makes the anti-submarining crossmember extend in a movement directed towards the rear of the seat before the said crossmember pivots forwards restraining the user's pelvis under the control of energy dissipation means. Preferentially, the pretensioner and the energy absorption means are combined into a given unit consisting of an energy dissipation pyrotechnical actuator of a known type.

The purpose of this invention is to propose an alternative solution to the latter anti-submarining crossmember system ensuring a better adaptability on certain types of seats and especially allowing a reduction in the overall size caused by the pyrotechnical actuator.

With these targets in mind, the subject of the invention is a seat pan for an automobile vehicle seat including an anti-submarining crossmember to limit the movement of the pelvis of a user towards the front of the seat, the crossmember extending crosswise to the seat pan framework and being movable towards the rear from a rest position to an extension position, and towards the front from the extension position whilst exerting pelvis retention forces during its movement towards the front of the seat, the seat pan including, for this purpose, extension means to move the crossmember from the rest position to the extended position and energy dissipation means to control, from a predetermined threshold, the said retention forces transmitted by the crossmember to the occupant of the seat.

According to the invention, the seat pan is characterised in that the crossmember is installed so as to pivot around a transverse axis on a sliding carriage guided in translation along a direction substantially longitudinal to the seat pan framework, the extension means are arranged so as to connect the crossmember and the carriage to make the crossmember pivot towards the rear in relation to the carriage, and energy dissipation means connecting the carriage to the seat pan framework to exert a retention force on the carriage during movement of the carriage forwards.

During a shock triggering the activation of the extension means, said extension means control the pivoting of the crossmember in relation to the carriage around the transverse pivoting axis. The crossmember then moves towards the rear and, at least in part, upwards, during this pivoting movement, which ensures the blocking of the bony parts of the pelvis of the person then sat in the seat, preventing or at least limiting the submarining movement mentioned in the introduction of this paper. After the extension of the crossmember and as soon as, under the effect of the inertia of the body of the said person, the force exerted by his/her pelvis on the crossmember reaches a predetermined threshold, this force is transmitted directly to the carriage which starts to move by sliding forwards in relation to the seat pan framework by calling on the energy dissipation means which tend to oppose this movement by progressively absorbing the kinematic energy of the body of the occupant of the seat. Note that the extension means restrain the crossmember in relation to the carriage in the extended position to avoid the crossmember pivoting in opposite direction after extension.

Preferentially, the crossmember extends until it reaches a position located to the rear of its pivoting axis and, therefore, slightly below the maximum height that it reaches when it is plumb with the said axis. Therefore, the forces exerted later by the user's pelvis on the crossmember generate on this crossmember only a reduced pivoting torque. These forces do not, or only a little, tend to make the crossmember pivot to oppose the action of the extension means and the major part of these retention forces are therefore directly applied to the carriage via the crossmember hinging means on the carriage. The extension means can therefore be designed to resist lower forces than those exerted on the crossmember during the energy dissipation phase allowing a reduction in their overall size.

According to a preferential design, the crossmember consists of a tubular or profiled element solidly attached to hinging means allowing the pivoting of the said element around a pivot shaft secured to the carriage, this shaft forming also a stiffening crossmember connecting two riders guided in translation in slides secured to the seat pan framework.

Preferentially, the extension means consist of one or more pretensioners such as pyrotechnical actuators the triggering of which is controlled by a strong deceleration. Preferably also, the extension means include a body and a flexible pull element, and the body is housed in the crossmember, and the flexible pull element, such as a cable, leaves the crossmember by an axial end, passes over a guide secured to the crossmember and is connected by its end to the carriage. Thus, the extension means require no space other than that of the said cable and its attachment to the carriage.

Also preferably, the energy dissipation means include elements extendable by plastic deformation, connecting the carriage to the seat pan framework, these elements being arranged so as to allow the movement of the carriage towards the front of the seat when they extend, and shaped so as to extend by plastic deformation when the force exerted on the crossmember reaches the previously mentioned threshold.

Preferably, an extendable element will be used on each side of the seat pan to ensure, as far as possible, movement of the crossmember parallel to itself, so limiting the risks of the crossmember becoming lopsided or over-centring in relation to the slides of the seat pan framework.

These extendable elements are preferably attached, on the one hand, to the carriage, and, on the other hand, to and towards the rear of the seat pan framework. This arrangement allows a sufficient length to be given to the said extendable elements and therefore also provides them with a sufficient elongation capability. Moreover, they are preferentially placed against the side flanges of the seat pan framework and the space they take up is therefore limited.

Each extendable element consists preferably of a strip, made of sheet steel for example, either corrugated transversally or including transverse cutouts. For the corrugated strip, the energy absorption corresponds to the energy required to straighten, that is flatten, the strip. Note that the term corrugation must be taken in its wide sense, including all forms given to the strip by bending or folding operations reducing the distance between the ends when compared with the real length of the strip.

For the strip with transverse cutouts, the absorption corresponds to the energy required to deform the strip whilst remaining more or less in its plane, the way in which the strip deforms being in a way initiated and controlled by the arrangement and the shape of the cutouts which include, for example, cuts made in the centre axial section of the strip but not through to the edges of the strip and which are moved apart by the deformation of the said edges during the elongation of the strip as will be seen later.

Additional explanations on such energy absorption extendable elements can be found in above mentioned document WO-01/19641.

Other characteristics and advantages of the invention will appear in the description which will be given of an example of the design of an anti-submarining system for an automobile seat in compliance with the invention.

Figure 2:
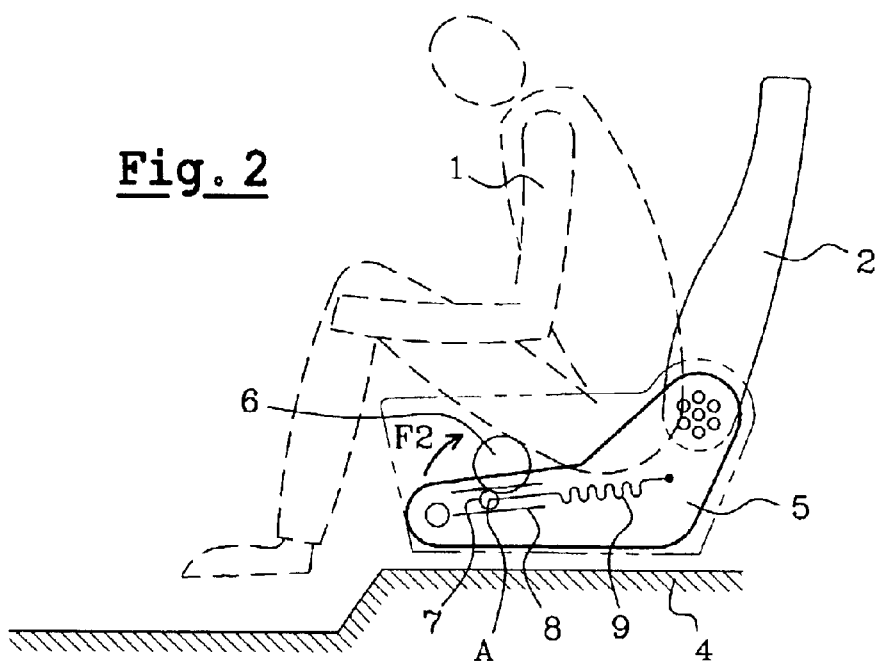
Figure 3:
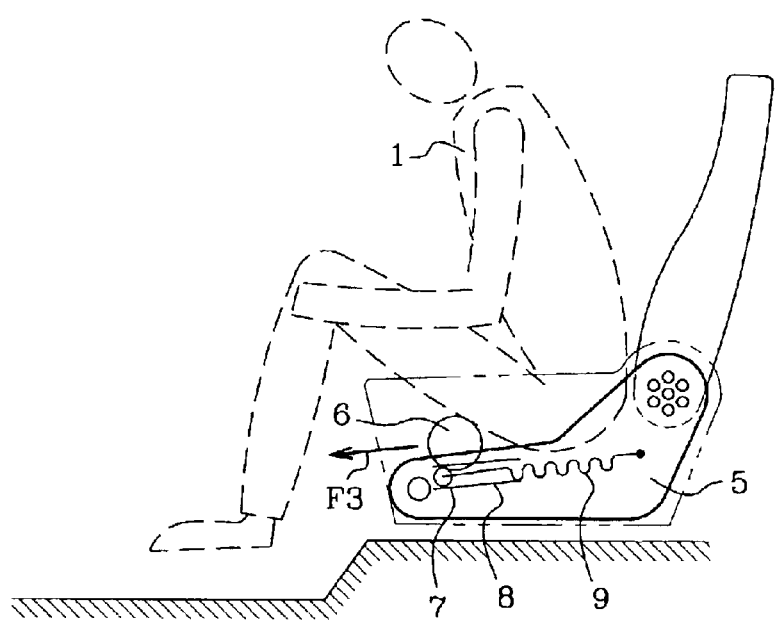
Figure 4:
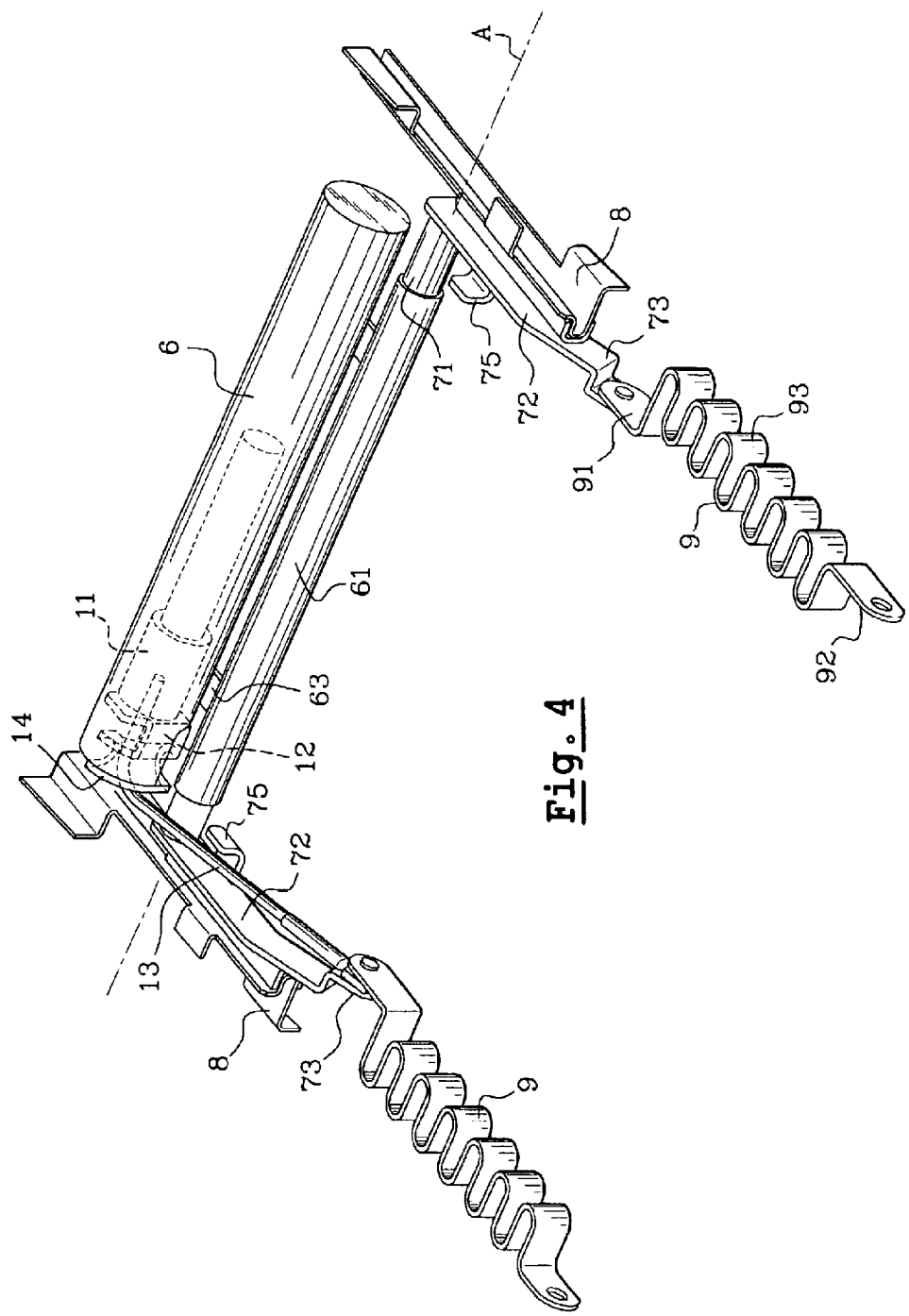
Figure 5:
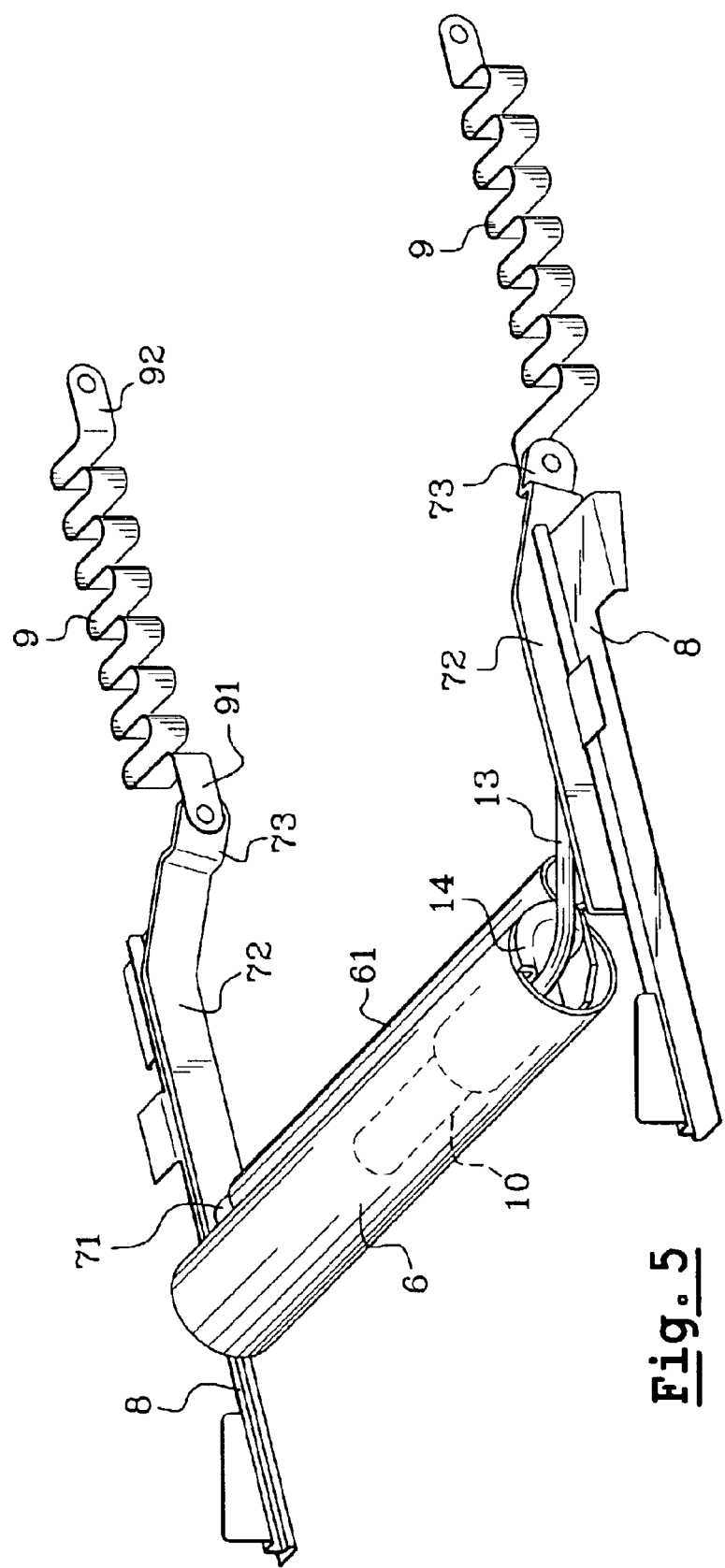
Figure 6:
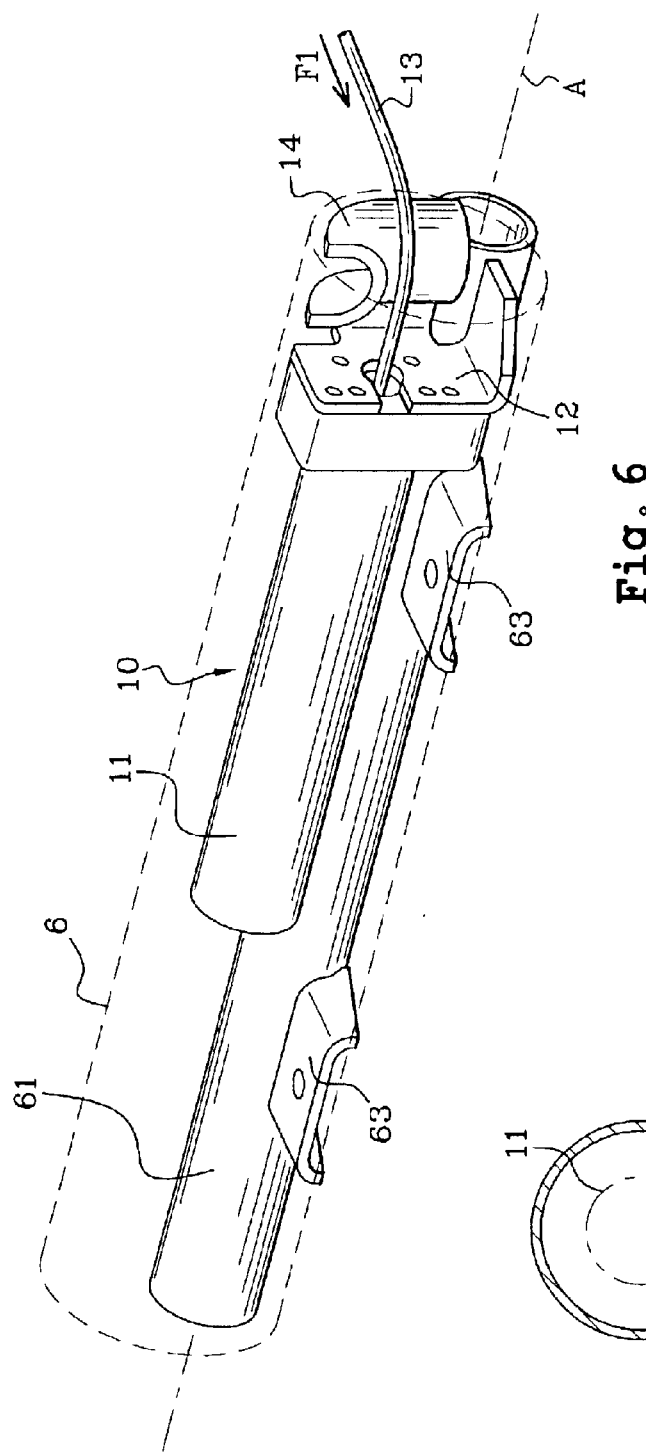
Figure 7:
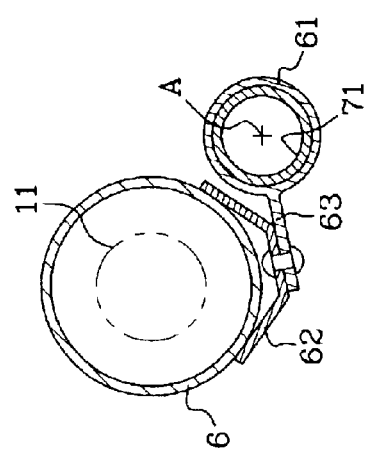

Refer to the appended drawings on which:

FIGS. 1 to 3 schematically illustrate the operation of this system in a seat in compliance with the invention when a shock tends to throw the user of the seat forwards, FIG. 4 is a perspective view of the anti-submarining system alone, RH rear view, with the anti-submarining crossmember in seat normal utilisation position, FIG. 5 is a perspective view of the anti-submarining system alone, LH front view, also in seat normal utilisation position, FIG. 6 is a detailed perspective view illustrating the installation of the pretensioner in the anti-submarining crossmember and the pretensioner cable guide, FIG. 7 is a cross-sectional view of the anti-submarining crossmember at the level of one of the lugs connecting the crossmember to its pivot.

The automobile vehicle seat, shown schematically on FIGS. 1 to 3, includes a backrest 2 hinged on the seat pan 3, this being attached to the floor 4 of the automobile vehicle in a known manner, for example by means of slides enabling longitudinal adjustment of the position of the seat.

The seat pan 3 includes a seat pan framework 5 and an anti-submarining crossmember 6, for example a tube or another profiled element of suitable section, which extends crosswise between the side flanges of the seat pan framework 5.

The crossmember 6 is installed so as to pivot around an axis A on a carriage 7, shown schematically on FIGS. 1 to 3, this carriage being guided longitudinally by a slide system 8 secured to the framework 5. Energy dissipation means 9, which will be detailed later, connect the carriage 7 to a fixed point located towards the rear of the seat pan framework 5.

In the design shown on FIGS. 4 to 7, the carriage 7 consists mainly of a shaft 71 having an axis A, solidly attaching two riders 72 guided in translation in a known manner, respectively on the two slides 8 attached to the flanges of the seat pan framework 5. Note that these slides are inclined slightly towards the bottom and towards the front of the seat as can be seen on FIGS. 1 to 3, in order to better accompany the natural movement of the user as he/she is thrown forward and his/her pelvis is pressed downwards during the energy dissipation phase as can be seen better later.

Each rider 72 extends towards the rear and is terminated by an attachment lug 73 to which is attached one end 91 of the energy dissipation means 9, the other end 92 being attached to the seat pan framework, as far as possible to the rear of this framework, to give the said energy dissipation means the best possible elongation capability. These energy dissipation means, or energy absorbers, are, in the design shown, extendable elements 9 consisting of a corrugated strip 93, made of steel for example. The corrugations shown on the figures can be obtained for example by performing alternate bending operations on an originally flat sheet. However, the shape, the number and the amplitude of the corrugations can be modified. For instance, the pitch or the amplitude of the corrugations could especially be varied on an element 9 to obtain a progressive energy absorption effect. Also, the strip could be replaced by a wire of sufficient section and with similar corrugations.

The anti-submarining crossmember 6 is installed so as to pivot on shaft 71 of carriage 7 by hinging means such as, for example, a pivot tube 61 rotating on the said shaft. The crossmember 6 is solidly attached to the pivot tube 61 by means of supports 62 welded to the crossmember and riveted to support lugs 63 secured to the pivot tube 61 for example by welding.

The extension means consist of a pretensioner 10 such a pyrotechnical actuator the body 11 of which is housed inside the tube constituting the anti-submarining crossmember 6 and attached to a support 12 solidly attached to the said crossmember. The pretensioner 10 also includes a pull cable 13 which comes out of the body 11 axially and is bent substantially at a right angle towards the rear of the seat passing via a guide 14 also secured to the crossmember 6 or the pivot tube 61. The end of the cable is attached to the carriage 7, for example to the attaching lug 73 of the rider 72 located on the side of the seat where the pretensioner is placed, at the attachment point of the extendable element 9. The guide 14 is shaped in the form of the portion of a torus to ensure correct positioning of the cable irrespective of the angular position of the crossmember as it pivots around axis A.

We will now explain the operation of the system in case of high deceleration of the vehicle for example in the case of an accident.

In the normal utilisation situation, as shown on FIG. 1, the anti-submarining crossmember 6 is located towards the front of the seat in relation to its pivoting axis A on the carriage, the carriage being retained in retracted position by extendable elements 9. In this position, the crossmember is located below the thighs of the person 1 sat in the seat and sufficiently withdrawn downwards so as not to be felt by the user.

In case of a frontal impact of the vehicle, the high deceleration which results actuates the pretensioner 10 in a known manner. Cable 13 is then pulled towards the inside of the body 11 of the pretensioner and of the crossmember 6 by sliding on the guide 14, in the direction shown by arrow F1 on FIG. 6. This makes the said crossmember pivot around axis A towards the rear in the direction shown by arrow F2 on FIG. 2 until it makes contacts with the stops 75 provided for this purpose on the carriage 7. By doing this, the crossmember 6 moves towards the pelvis of the user 1 and very quickly blocks the user's forward movement thus preventing the occupant of the seat from sliding under the ventral portion of the seatbelt.

When the force exerted by the pelvis of the user of the seat on the crossmember reaches a predetermined threshold, this force is transmitted to the carriage 7 which begins to slide forwards on the slides 8, in the direction shown by arrow F3 on FIG. 3, causing the extension of the extendable elements 9 which then undergo plastic deformation absorbing the kinetic energy of the user's body.

Note that energy dissipation is ensured to a certain amount even if the anti-submarining crossmember is not activated by the pretensioner, that is if it remains in its original position as shown on FIG. 1. Indeed, as can be seen on this figure, if the pelvis of the user slides towards the front of the seat, it finally comes into contact with the crossmember in rest position and, if the force exerted at this time becomes sufficiently high and exceeds the predetermined threshold, the carriage can then slide forwards causing the extension of the extendable elements and therefore the dissipation of a certain amount of energy.

The invention is not limited to the design described above only as an example. In particular, instead of being placed in the tube or on the profiled element comprising the crossmember 6, the pretensioner could be attached to the carriage and the end of its cable attached to the crossmember. Also, other energy dissipation elements could be used, for example those described in above mentioned document WO-01/19641, or any other energy dissipation means suitable to restrain the movement of the carriage by absorbing the kinetic energy that it receives from the anti-submarining crossmember.

What is claimed is:

1. Seat pan (3) of an automobile vehicle seat including an anti-submarining crossmember (6) to limit the movement of the pelvis of a user (1) towards the front of the seat, the crossmember extending crosswise to the seat pan framework (5) and being especially movable towards the rear from a rest position to an extension position and towards the front from the extension position whilst exerting pelvis retention forces during its movement towards the front of the seat, the seat pan including for this purpose extension means (10) to move the crossmember (6) from the rest position to the extension position and energy dissipation means (9) to control, from a predetermined threshold, the said retention forces transmitted by the crossmember to the occupant of the seat, characterised in that the crossmember (6) is installed so as to pivot around a transverse axis (A) on a sliding carriage (7) guided in translation according to a direction substantially longitudinal to the seat pan framework, the extension means (10) are arranged so as to connect the crossmember (6) and the carriage (7) to make the crossmember pivot towards the rear in relation to the carriage and energy dissipation means (9) connecting the carriage (7) to the seat pan framework (5) to exert a retention force on the carriage during movement of the carriage forwards.

2. Seat pan in accordance with claim 1, characterised in that the anti-submarining crossmember (6) extends until it reaches a position located behind its pivoting axis (A).

3. Seat pan in accordance with claim 1, characterised in that the carriage (7) includes stops (75) limiting the movement of the anti-submarining crossmember (6) towards the rear.

4. Seat pan in accordance with claim 1, characterised in that the anti-submarining crossmember consists of a tubular or profiled element (6) solidly attached to the hinge means (61) allowing the pivoting of the said element (6) around a pivot shaft (71) secured to the carriage (7).

5. Seat pan in accordance with claim 1, characterised in that the carriage (7) includes a stiffening crossmember (71) connecting to riders (72) guided in translation in the slides (8) secured to the seat pan framework (5).

6. Seat pan in accordance with claim 5, in combination with claim 4, characterised in that the stiffening crossmember (71) comprises the pivot shaft of the anti-submarining crossmember (6).

7. Seat pan in accordance with claim 1, characterised in that the extension means consist of one or more pretensioners (10) such as pyrotechnical actuators with triggering controlled by a high deceleration force.

8. Seat pan in accordance with claim 1, characterised in that the extension means include a body (11) and a flexible pull element (13), and the body (11) is housed in the anti-submarining crossmember (6) and the flexible pull element comes out of the crossmember at an axial end, passes over a guide (14) secured to the crossmember and is connected by its end to the carriage (7).

9. Seat pan in accordance with claim 1, characterised in that the energy dissipation means include elements extendable by plastic deformation (93) connecting the carriage (7) to the seat pan framework (5), these elements being arranged in order to allow the movement of the carriage towards the front of the seat when they extend and shaped so as to extend by plastic deformation when the force exerted on the crossmember reaches a predetermined threshold.

* * * * *